United States Patent
Pao

(10) Patent No.: US 8,503,542 B2
(45) Date of Patent: Aug. 6, 2013

(54) METHODS AND APPARATUS TO REDUCE BLOCKING NOISE AND CONTOURING EFFECT IN MOTION COMPENSATED COMPRESSED VIDEO

(75) Inventor: I-Ming Pao, Palo Alto, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2196 days.

(21) Appl. No.: 10/941,174

(22) Filed: Sep. 14, 2004

(65) Prior Publication Data

US 2005/0207492 A1    Sep. 22, 2005

Related U.S. Application Data

(60) Provisional application No. 60/554,530, filed on Mar. 18, 2004.

(51) Int. Cl.
H04N 7/12 (2006.01)
H04N 11/02 (2006.01)

(52) U.S. Cl.
USPC ................................. 375/240.29; 375/240.16

(58) Field of Classification Search
USPC ..................................................... 375/240.16
See application file for complete search history.

(56) References Cited

U.S. PATENT DOCUMENTS

| 5,812,193 | A | 9/1998 | Tomitaka et al. |
| 5,819,035 | A | 10/1998 | Devaney et al. |
| 5,850,294 | A | 12/1998 | Apostolopoulos et al. |
| 6,178,205 | B1 * | 1/2001 | Cheung et al. ........... 375/240.29 |
| 6,404,814 | B1 | 6/2002 | Apostolopoulos et al. |
| 6,577,679 | B1 | 6/2003 | Apostolopoulos |
| 6,741,752 | B1 | 5/2004 | Yang |
| 7,227,901 | B2 * | 6/2007 | Joch et al. ................ 375/240.29 |
| 2002/0131647 | A1 | 9/2002 | Matthews |
| 2003/0086496 | A1 | 5/2003 | Zhang et al. |
| 2003/0219073 | A1 * | 11/2003 | Lee et al. ................. 375/240.27 |
| 2004/0012675 | A1 | 1/2004 | Caviedes |

OTHER PUBLICATIONS

Tavares, J., et al.; Improving Error Robustness of H.263 Bitstreams, Instituto de Telecomuncacoes, Universidade De Aveiro, Campus Universitario,DateUnknown, Aveiro, Portugal, 4 pps.

Chou, J., et al.; A Simple Algorithm for Removing Blocking Artifacts in Block-TransformCoded Images, Department of Electrical and Computer Engineering, University of Illinois, Sep. 27, 1997, pp. 1-10.

(Continued)

*Primary Examiner* — Richard Torrente
(74) *Attorney, Agent, or Firm* — John P. O'Banion

(57) ABSTRACT

Method and system for removing artifacts, such as blocking noise and contouring effects, from a block-encoded video signal. One method for removing blocking artifacts includes but is not limited to decoding the block-encoded signal to obtain a decoded sequence of video frames and one or more associated motion vectors. By using the motion vector, the location of one or more blocking artifacts may be identified within at least one of the frames. The location identified by the motion vector is filtered to remove at least some of the blocking artifacts. Another method for removing contouring effects comprises decoding the block-encoded signal to obtain a decoded sequence of video frames, detecting a contouring effect by evaluating the macroblock mode and DCT coefficient information from the decoded signal, and filtering one or more blocks correlating to the detected contouring effect.

34 Claims, 11 Drawing Sheets

OTHER PUBLICATIONS

Panis, S., et al.; A Method for Reducing Block Artifacts by Interpolating Block Borders,Downloadedfrom Internet Aug. 2004, Siemens AG, Munich, Germany, pp. 1-8.

Panis, S., et al.; Reduction of Block Artifacts by Selective Removal and Reconstruction of the Block Borders, Proc. 1997 Picture Coding Symposium,Berlin, Germany ,Sep. 10-12, 1997, pp. 705-708.

* cited by examiner

METHODS AND APPARATUS TO REDUCE BLOCKING NOISE AND CONTOURING EFFECT IN MOTION COMPENSATED COMPRESSED VIDEO

CROSS-REFERENCE TO RELATED APPLICATIONS

This application claims priority from U.S. provisional application Ser. No. 60/554,530 filed on Mar. 18, 2004, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

A portion of the material in this patent document is also subject to protection under the maskwork registration laws of the United States and of other countries. The owner of the maskwork rights has no objection to the facsimile reproduction by anyone of the patent document or the patent disclosure, as it appears in the United States Patent and Trademark Office publicly available file or records, but otherwise reserves all maskwork rights whatsoever. The maskwork owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to methods and systems for removing artifacts found in block-encoded video signal, and more particularly to removing blocking artifacts and contouring effects found in block-encoded video signals.

2. Description of Related Art

The popularity of digital video has increased dramatically. In order to minimize the bandwidth for transmission and the amount of storage space, compression techniques are utilized to reduce the size of video. Video is a sequence of frames of image data. Each frame is typically displayed as a two-dimensional array of pixels. Each frame is subdivided into data subsets which we denote as "macroblocks" of data. Motion estimation is performed on the macroblock to find the best match between the macroblock and the reference frame. The residual error is then transformed by discrete cosine transform (DCT) and quantized.

For each macroblock, motion estimation is performed by finding the candidate which can most efficiently represent the macroblock in the reference picture within the search range. This best-matched location is encoded in the form of a motion vector. At the decoder side, the motion vector is then used to reconstruct the video frame by copying the pixel values at the corresponding location in the reference frame. Because motion compensation can reduce temporal redundancy, it is widely used in current video standards (e.g., MPEG and H.263) to achieve the goal of compression.

When a transform coded image is reconstructed, the image may include a number of visible artifacts of the compression process, e.g., "blocking effect", "contour effect," "ringing artifact," "staircase noise," etc.

The blocking effect is the result of the approximation of the DC transform coefficient during quantization. In quantizing the transform coefficients the encoder selects one of the available quantization parameters closest in value to the coefficient to represent the coefficient. This "rounding off" can produce pixels of visually different colors in adjacent blocks even though the corresponding pixels of the original image were nearly identical. As a result, blocks of pixels created for the transform coding process may be visible in the reconstructed image. The blocking effect becomes more pronounced as the quantization steps are coarsened to reduce the data rate. The blocking effect is a particular problem along edges or color boundaries in the image or in areas of the image that are of relatively uniform color.

Generally, in a low bit-rate case, the blocking noise will occur at the block boundaries and the motion compensation scheme will make things worse by propagating the blocking noise to the following predicted frames. Various de-blocking techniques have been proposed for reducing the blocking noise. These techniques can reduce the blocking noise near the block boundary, but fail to reduce the noise at the center region of the block. The noise at the center region of the block is due to the blocking noise from the previous frame which is used as the reference frame. After motion compensation, the noise at the boundary from the previous frame is moved to the center of the block and existing de-blocking techniques fail to detect this situation and noise is unable to be reduced.

FIG. 1 shows the diagram of a typical video decoding system 10. Examples of this system are DVD players or direct satellite receivers which use MPEG-1, 2, 4 as the video coding standards. The system receives the video bitstream 12 and decodes the bitstream with a variable length decoder (VLD) 14. If the macroblock is intra-coded, the quantized coefficients are inverse quantized (IQ) followed by inverse DCT (IDCT) 16 to get the reconstructed pixel values. If the macroblock is inter-coded, the decoded pixel value will be the sum of the output of IDCT 16 and the motion-compensated references using motion vector (MV) values 18 (the loop shown in FIG. 1). The dashed-line in FIG. 1 shows a regular decoder 20 which requires the conformance to the video standard. The decoded video frame is processed by the de-blocking filter 22 to reduce the blocking noise and the modified video is then output to display 26.

The implementation of the de-blocking filter as shown in FIG. 1 is not normative in the MPEG-1, 2, 4 standard, because the system has the tendency to have high computation requirement or be unsuccessful in reducing the noise at the center region of a block. A sample filtered frame 29 using the system of FIG. 1 is shown in FIG. 2. By decoding the information contained in the bitstream and the previous decoded frame stored in the frame memory 25, we can reconstruct the frame 28, which is the output of the regular decoder 20. There are noticeable blocking noises on the reconstructed frame and de-blocking filter is necessary to reduce the noise. However, most of the filters are implemented only to check the pixels close to the block boundary 32, which will fail to reduce the noise caused by the noise propagated by motion compensation. As FIG. 2 shows, the blocking noise is still observed at the center region of the block 30 after de-blocking filtering.

In addition to blocking artifacts, contouring effects will show in the region with a smooth gradation in the luminance level in low bit rate cases. An example of contouring effect is shown in FIGS. 3A and 3B. FIG. 3A illustrates a scene of a smooth surface that is lighted by a lamp from a tilted angle. In the upper middle part of FIG. 3B, groups of neighboring pixels have the same values after decoding. The boundaries of these constant pixel regions are called "contours," and are generally annoying to the human visual system.

Accordingly, it is an object of the present invention to provide an improved system for filtering blocking noise from a blocked video image.

It is a further object of the present invention to provide an improved system for reducing contouring effects from a blocked video image.

At least some of these objectives will be met in the inventions described hereinafter.

BRIEF SUMMARY OF THE INVENTION

In one aspect of the invention, a method is disclosed for decoding a block-encoded video signal having blocking artifacts resulting from the encoding process. The method comprises decoding the block-encoded signal to obtain a decoded sequence of video frames, at least some of which have one or more associated motion vectors, identifying the location of one or more blocking artifacts using the motion vector, and filtering the location identified by the motion vector to remove at least some of the blocking artifacts. Each video frame generally comprises a plurality of macroblocks each comprising an array of pixels. An important aspect of the present method is the ability to filter blocking artifacts at a location toward the center of the macroblock.

Typically, identifying the location of one or more blocking artifacts comprises determining whether a macroblock is an intra-coded macroblock or an inter-coded macroblock. Filtering the location identified by the motion vector is only performed on inter-coded macroblocks.

Preferably, each inter-coded macroblock is further evaluated to determine whether a discontinuity associated with the motion vector is an artificial or an actual image edge, as only artificial discontinuities are filtered to keep the resolution of actual image edges. One way to determine whether a discontinuity is artificial is by evaluating the pixels bordering both sides of the discontinuity. Filtering is only applied to the discontinuity if the difference in the pixels fall below a threshold value. Where a quantization parameter is obtained from the decoded video signal, the discontinuity may be filtered if the absolute value of the pixel difference on both sides of the discontinuity is less than two times the quantization parameter.

In one embodiment of the invention, filtering the location within the frame comprises filtering the outer two most pixels bordering both sides of the discontinuity. Typically, a low pass filter is applied to remove the blocking artifact. However, any filtering method currently known in the art may be used to smooth out the blocking noise. In addition to removing blocking noise associated with the motion vector, additional filtering of the macroblock may be performed at the macroblock boundary.

In another aspect of the invention, a system is disclosed for decoding a block-encoded video signal comprising a sequence of video frames, at least some of which having one or more associated motion vectors. The system generally comprises a first processing element adapted to execute macroblock decoding operations, a second processing element adapted to identify the location of at least one blocking artifact, wherein the blocking artifact location correlates to a motion vector obtained from the macroblock decoding operation, and a first filter for smoothing blocking artifacts at the blocking artifact location correlating to the motion vector.

The first filter preferably comprises a low pass filter, and in particular a five-tap low pass filter. The system may further comprise a second filter for filtering blocking artifacts at a boundary of the macroblocks.

In yet another aspect of the invention, an apparatus is disclosed for decoding a block-encoded video signal having blocking artifacts resulting from the encoding process. The apparatus comprises a means for decoding the block-encoded signal to obtain a decoded sequence of video frames, at least some of which have one or more associated motion vectors, means for identifying the location of one or more blocking artifacts via data contained in the motion vector, and means for filtering the location within the frame identified by the motion vector to remove at least some of the blocking artifacts.

In a preferred embodiment, the apparatus further includes a means for filtering a macroblock boundary to remove at least some of the blocking artifacts.

The apparatus preferably also includes a means for determining whether the macroblock is inter-coded or intra-coded, wherein only inter-coded macroblocks are filtered. In addition, a means for determining whether a discontinuity associated with the motion vector is an artificial discontinuity or a real image edge is provided.

In yet another aspect of the invention, an apparatus is disclosed for removing blocking artifacts from a decoded video signal. The apparatus may comprise a standalone device used to enhance the output of a decoder. The apparatus comprises a processing element adapted to identify the location of at least one blocking artifact, wherein the blocking artifact location correlates to a motion vector obtained from the decoded video signal. The apparatus also comprises first filter for smoothing blocking artifacts at the blocking artifact location correlating to the motion vector. In addition to the first filter, a second filter for filtering blocking artifact at a boundary of the macroblocks may be included.

In yet another aspect of the invention, a method is disclosed for removing blocking artifacts from a block-encoded video signal. The method may comprise post-processing software to enhance the output of a decoder. The method comprises the steps of identifying a location of one or more blocking artifacts correlating to a motion vector obtained from the decoded signal, and filtering the location within the frame identified by the motion vector to remove at least some of the blocking artifacts.

In a further aspect of the invention, a method is disclosed for decoding a block-encoded video signal having contouring effects from the encoding process. The method comprises decoding the block-encoded signal to obtain a decoded sequence of video frames, each of which comprises a plurality of macroblocks having macroblock mode information and DCT coefficient information, detecting a contouring effect by evaluating the macroblock mode and DCT coefficient information, and filtering one or more blocks correlating to the detected contouring effect.

Where the contouring effect forms a boundary between first and second adjacent blocks of pixels, the boundary will not be considered for evaluation as a contouring effect unless each block is an intra-coded block, wherein the boundary is considered for further evaluation as a contouring effect candidate if both the first and second blocks are found to be intra-coded blocks, and the only non-zero coefficients in both of the first and second blocks are DC coefficients, i.e., none of the AC coefficients in both the first and second blocks are non-zero.

In addition, a boundary is only considered a contouring effect if, after evaluating whether a boundary comprises an actual image edge or an artificial image edge, the boundary is found to be an artificial image edge. To determine whether the boundary is an artificial edge or actual image edge, the pixels bordering both sides of the boundary are evaluated. The boundary is considered a contouring effect if the difference in the pixels fall below a threshold value. Where a quantization parameter is obtained from the decoded video signal, the boundary is considered a contouring effect if the absolute value of the pixel difference on both sides of the discontinuity is less than two times the quantization parameter.

Preferably, filtering one or more blocks comprises applying a uniform low-pass filter. The method further comprises determining the size of the filter by comparing adjacent blocks on a first side of the boundary. In addition, adjacent blocks on a second side of the boundary opposite from the first side are also compared. The number of consecutive similar blocks away from the boundary are totaled on each side. Generally, a block is considered similar if the value of the pixel adjacent the block boundary of the first block is the same as the value of the first two pixels adjacent the boundary in the second block. In a preferred configuration, the size of the filter is equal to the lesser of the similar block totals on either side of the boundary multiplied by the number of pixels in one row of a block.

In yet another aspect of the invention, a system for decoding a block-encoded video signal having contouring effects comprises a first processing element adapted to decode the block-encoded signal to obtain a decoded sequence of video frames, each comprising a plurality of macroblocks having macroblock mode information and DCT coefficient information, a second processing element adapted to detect a contouring effect by evaluating the macroblock mode and DCT coefficient information, and a filter for filtering one or more blocks correlated to the detected contouring effect.

In yet another aspect of the invention, a method for removing contouring effect from a block-encoded video signal comprises collecting macroblock mode information and DCT coefficient information from the video signal, detecting a contouring effect by evaluating the macroblock mode and DCT coefficient information, and filtering one or more blocks correlating to the detected contouring effect.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the systems and methods generally shown in FIG. 4 through FIG. 12. It will be appreciated that the methods may vary as to configuration and as to details of the parts, and that the methods may vary as to the specific steps and sequence, without departing from the basic concepts as disclosed herein.

1. Reduction of Blocking Noise

FIG. 4 through 7 illustrate a simple but effective system and method for reducing the blocking noise regardless of the noise location. It has been recognized that the undesirable blocking noise at the center region of a block in a predicted frame is caused by motion compensation. The disclosed system and methods reduce the noise by tracking the motion vector information for the block. As a result, the artifact introduced by the noise from the reference frame and motion compensation can be reduced.

Figure 1:
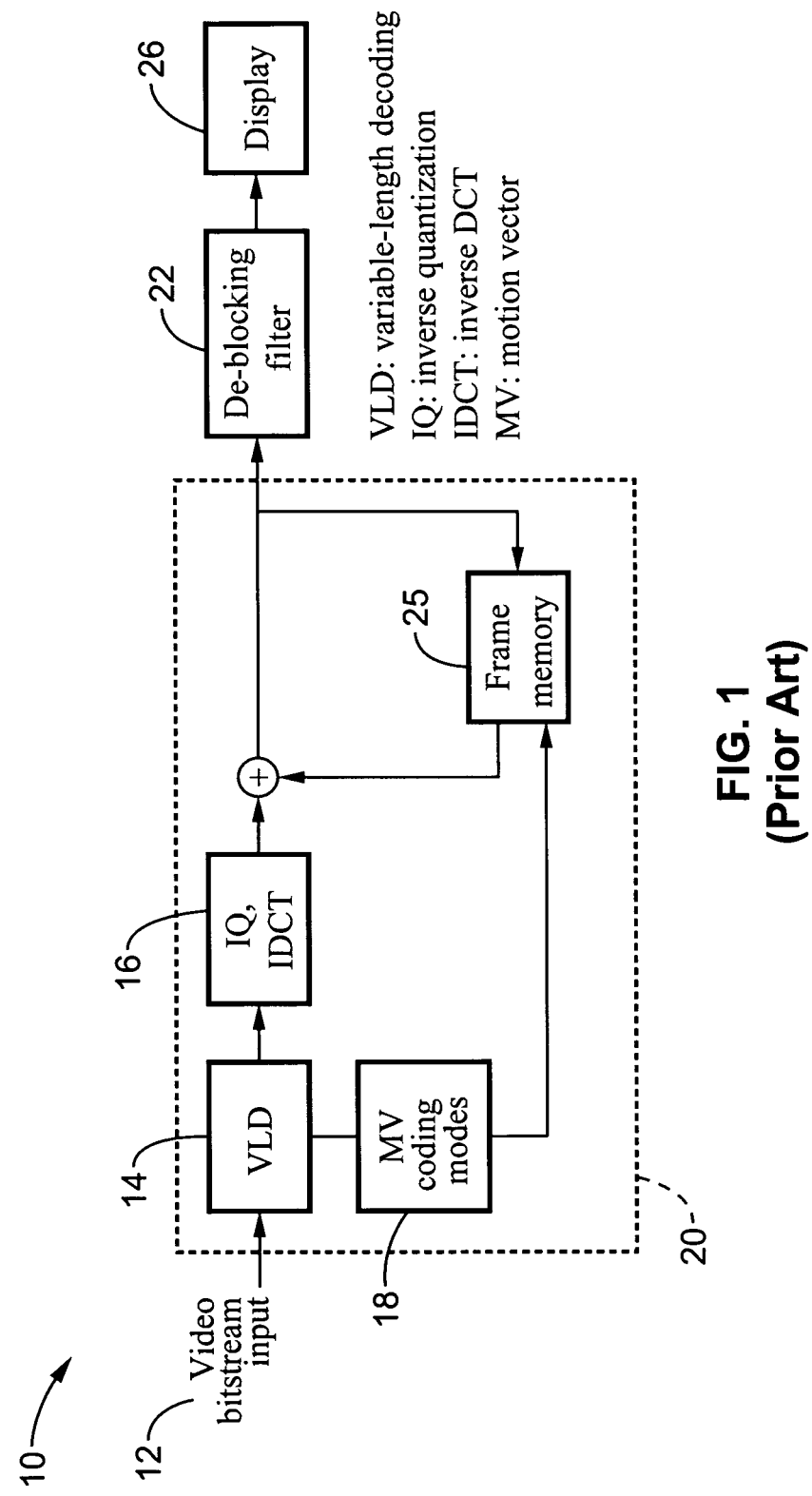
FIG. 1 is a schematic view of a prior art decoding system incorporating a de-blocking filter.
Figure 2:
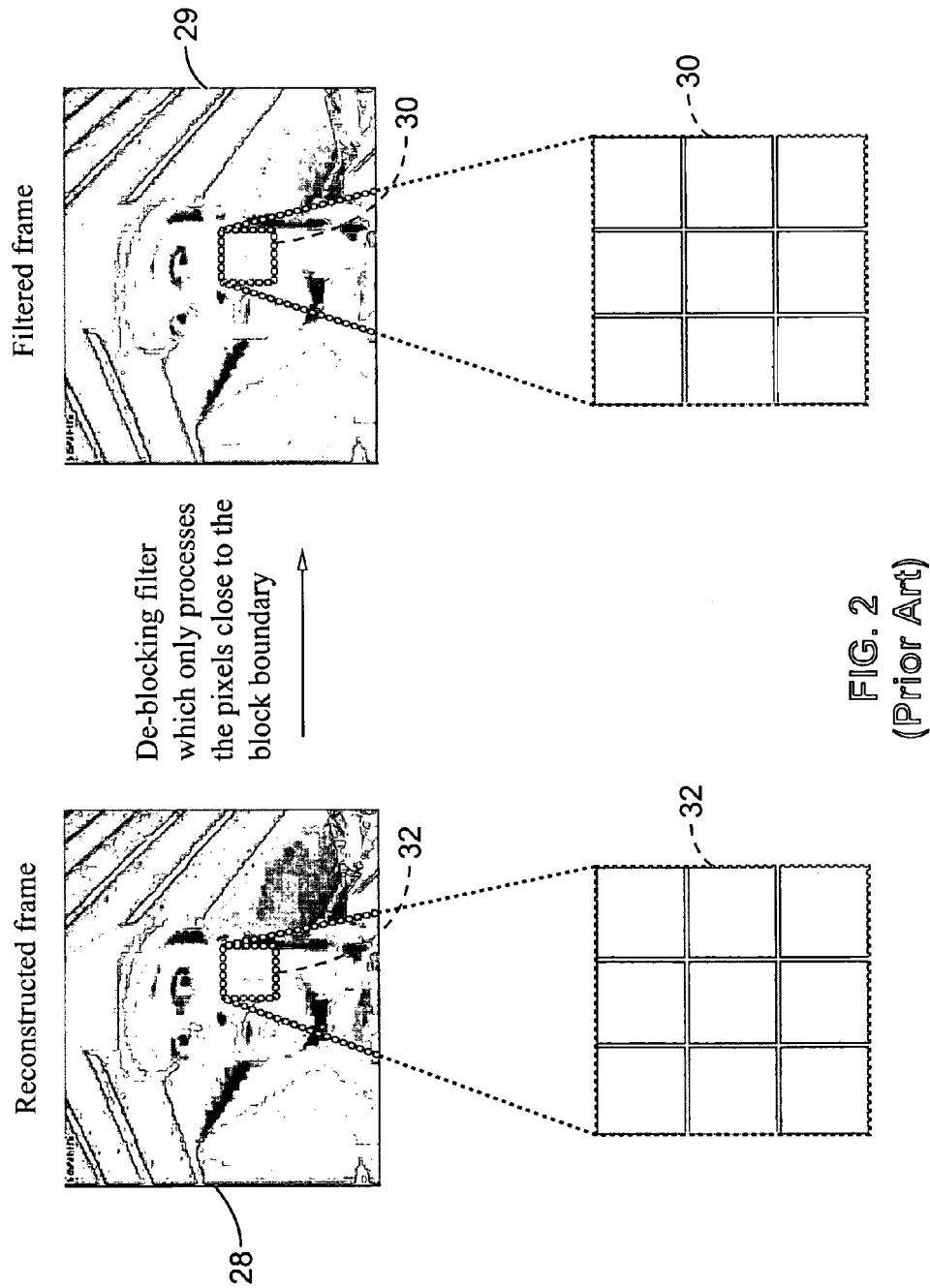
FIG. 2 shows the output of the system of FIG. 1.
Figure 4:
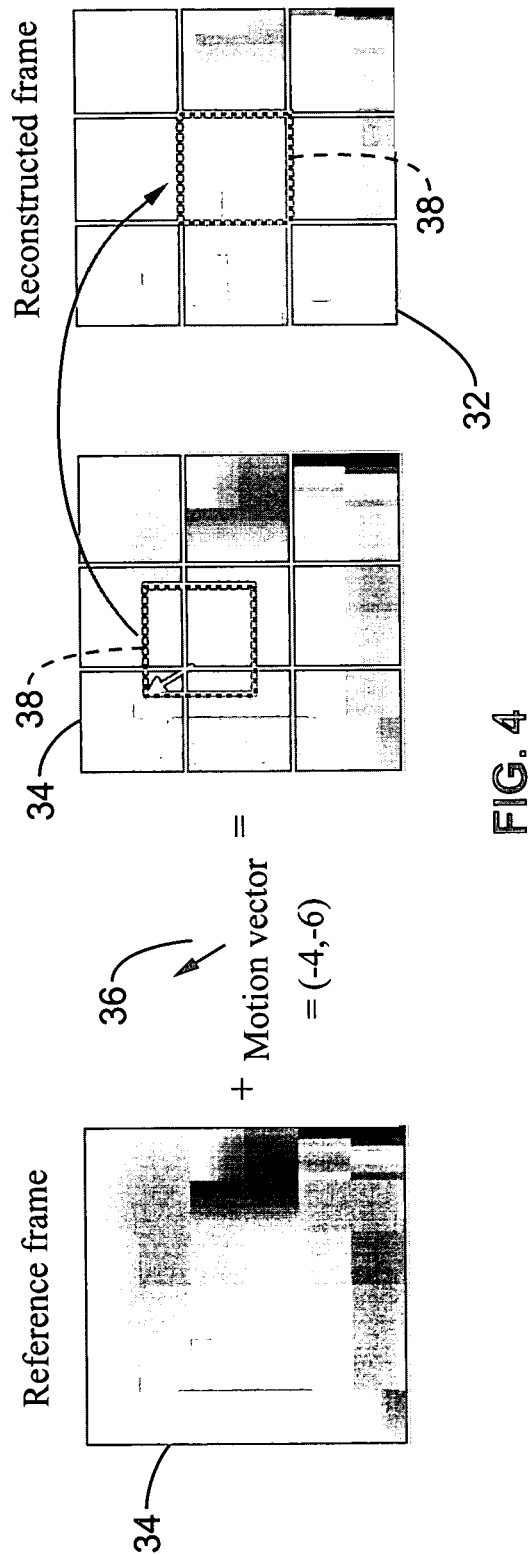
FIG. 4 illustrates the blocking noise correlating to the motion vector in a reconstructed frame.

The reason for the blocking noise occurring at the center region of the block is explained in FIG. 4. For purposes of illustration, the center macroblock 32 of the 3×3 macroblocks in FIG. 2 will be used as an example. The macroblock 32 is coded as an inter-block, the motion vector is (−4, −6), and there is no residual to add after motion compensation. So to reconstruct the macroblock 32, the block 38 values from the reference frame 34 at the location of (−4, −6) are copied to the macroblock 32, where (0, 0) is the top-left corner of the macroblock. The reference frame 34 is an I-picture and the blocking noises occur at the block boundary (the white lines represent the macroblock boundary and each macroblock has 16×16 pixels, with each macroblock being subdivided into four 8×8 blocks). However, the noise originally occurring at the block boundary is propagated to the center of the block due to motion compensation for the reconstructed frame as shown in FIG. 4.

Figure 5:
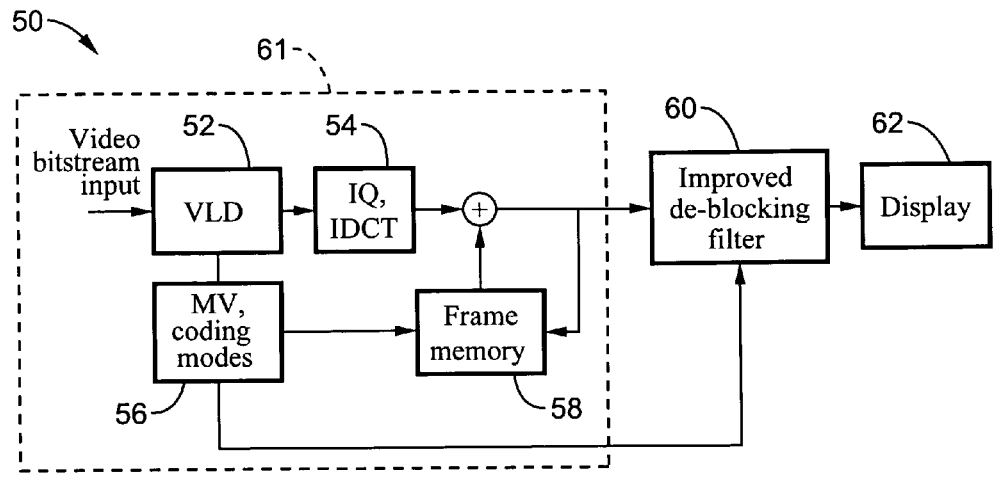
FIG. 5 is a schematic view of an improved de-blocking filter according to the present invention.

FIG. 5 illustrates a system 50 of the current invention which utilizes an improved de-blocking filter 60 that tracks motion vector and coding mode information for the de-blocking process. By using this information, the system can identify the possible location where the blocking noise occurs and the de-blocking filter is applied. De-blocking filter 60 may comprise a stand-alone, post processing unit, or may be integrated with the decoder to form an improved decoder.

First, in the decoding process, the decoder 61 will decode from the bitstream the macroblock and reference information 56, such as the motion vector and coding modes. The motion vector is used to locate the position in the reference frame for motion compensation and the macroblock coding mode is used to decide the macroblock is intra or inter-coded. After the decoder 61 reconstructs the decoded frame, the improved de-blocking filter 60 uses the motion vector and mode information to trace the location of possible blocking noise in the frame. Once the location is identified, filtering is performed to reduce the noise.

Using the macroblock 32 in FIG. 4 as an example, de-blocking filter 60 now has the information of motion vector (−4, −6), so the blocking noise can be expected to occur between pixel columns 4 and 5, between columns 12 and 13, between rows 6 and 7, and between rows 14 and 15.

Figure 6:
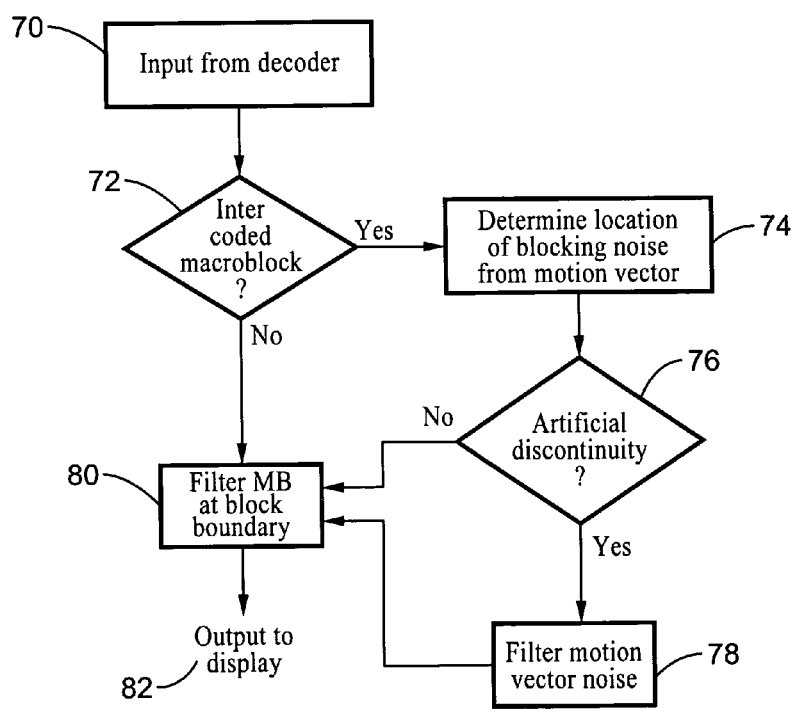
FIG. 6 illustrates a preferred process for removing blocking noise from a block encoded video signal.

FIG. 6 illustrates a preferred method for filtering the blocking noise. After receiving the reconstructed video signal from decoder (step 70), each macroblock is checked to determine whether it is an inter-coded or intra-coded macroblock, shown as step 72. If the block is an inter-coded block, the possible blocking noise location is determined from the motion vector, shown as step 74. If the block is an intra-coded macroblock, the motion vector filtering process is bypassed and the macroblock is filtered at the block boundary only, shown as step 80.

After knowing the possible noise locations, any discontinuity appearing near the motion vector block boundary 38 is first evaluated to determine whether the discontinuity is an actual image edge, as seen in step 76. Generally, smoothing out artificial discontinuities between blocks improves image quality, whereas smoothing out actual image edges degrades image quality. To determine if the discontinuity is an actual image edge or an artificial discontinuity, the pixels on each edge of the boundary are compared. If the absolute value of the pixel difference on both sides of the boundary is below a threshold value, e.g. less than two times the value of the quantization parameter, than the pixel in question is assumed to be a false edge, and the motion vector filtration step will be applied to the block to smooth out the discontinuity, shown as step 78. If the pixel difference is more than the threshold value, the pixel is assumed to be a true edge and is passed through the system unprocessed in order to retain image sharpness. The unprocessed macroblocks may be processed at the block boundary with filter 80, which may also apply an artificial/actual edge determination.

Generally, motion vector filter 78 consists of a five-tap low-pass filter, e.g. {1,1,2,1,1}/6, that filters the two pixels closest on each side of the motion vector boundary. However, a number of commonly known smoothing techniques or filters known in the art may be used to filter the blocking noise once the location is found. For example a three-tap filter, e.g. {1,2,1}/4, may also be used to apply more subtle smoothing effects. The filter coefficients may also be changed, e.g. {1,2,4,2,1}/10, particularly in situations having different texturing requirements. Several other conventional factors associated therewith should be considered in choosing a filter or smoothing technique, e.g., whether the smoothing technique should be linear or nonlinear, or how "heavy" or "soft" the smoothing should be. After filtering in step 78 is applied to the macroblock, the macroblock is then filtered at the macroblock boundary, as shown in step 80.

Figure 7:
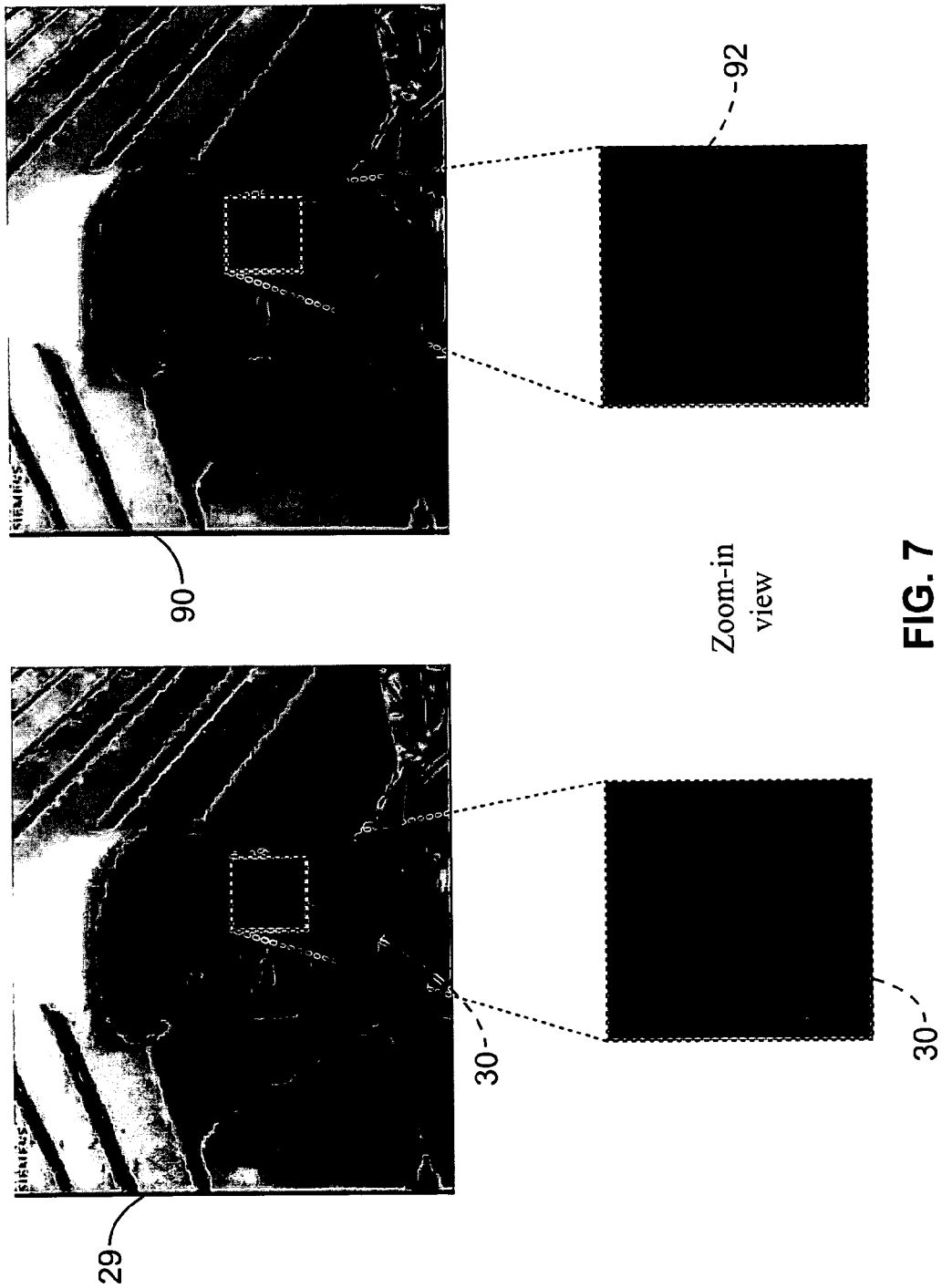
FIG. 7 illustrates the improved output from a method of the current invention compared to the system of FIG. 1.

FIG. 7 illustrates the comparison of the de-blocking filter performance. Frame 29 shows the output after filtering only at the macroblock boundary. Significant blocking effect is noticeable at both frame 29 and the close-up of macroblock 30. Frame 90 shows the output processed with the motion vector-enhanced filtering of the present invention. The blocking effect is considerably reduced at both frame 90 and macroblock 92.

2. Reduction of Contouring Effect

Figure 8A:
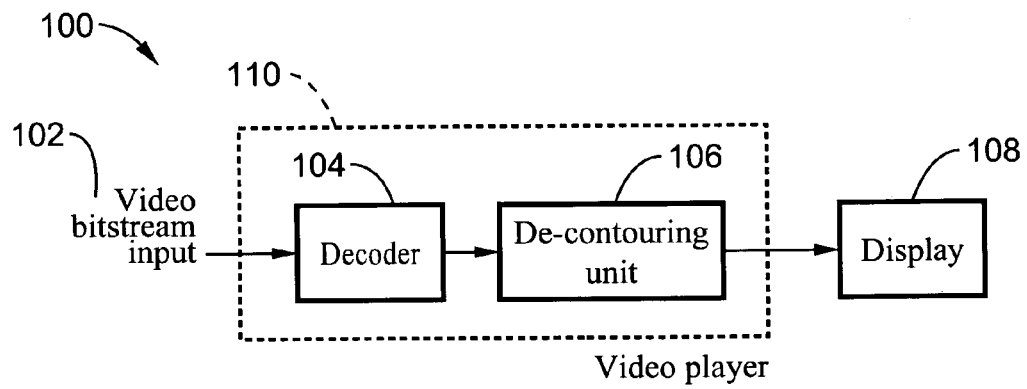
FIG. 8A is a schematic view of a video player having de-contouring unit in accordance with the present invention.

FIG. 8A shows a high level block diagram of an exemplary system 100 that operates as a video player with the method of the current invention to reduce the contouring effect. As illustrated in FIG. 8A, video player 110 receives video bitstream 102 and decodes the bitstream with decoder 104. Video player 110 may comprise a variety of decoders, such as a DVD player, direct satellite receiver, etc. In addition to reconstructing the image frames, decoder 104 decodes the macroblock mode and DCT coefficients from the bitstream. The decoded video frames are then processed by de-contouring unit 106 to remove the contouring effect. The modified video is then output to display 108.

Figure 9:
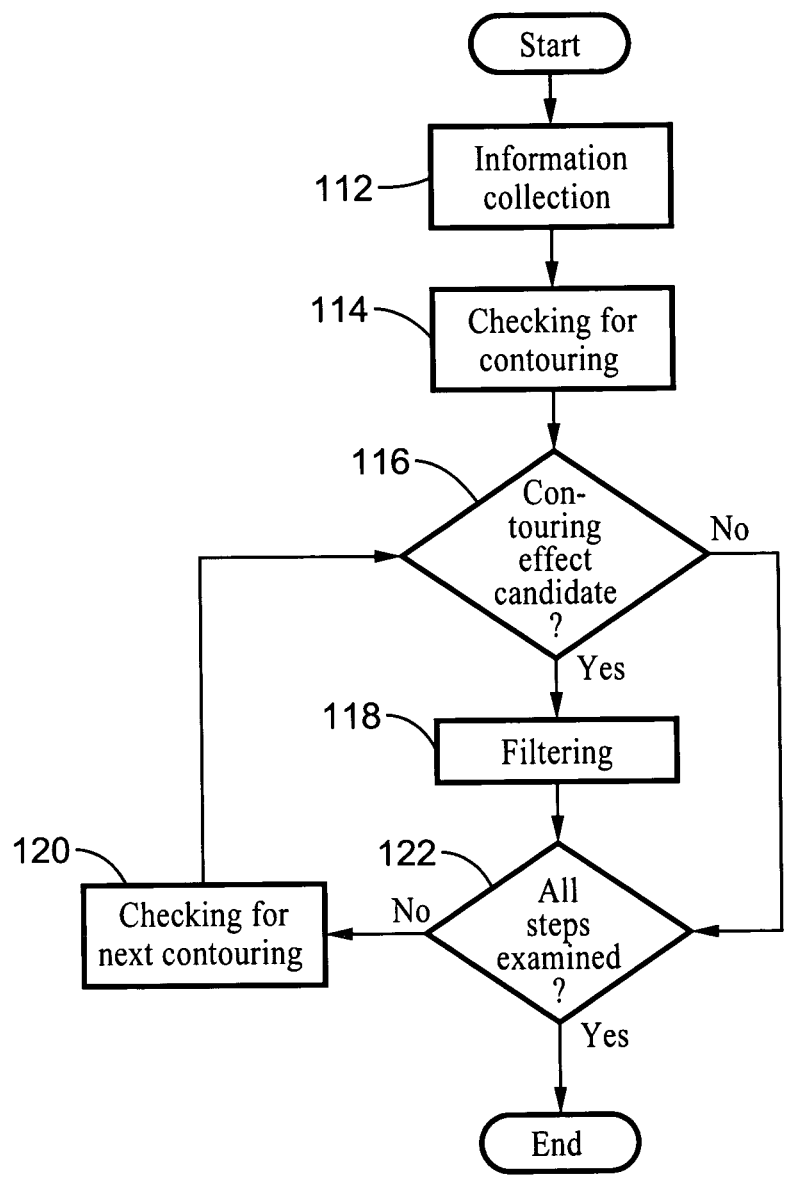
FIG. 9 shows a flow chart for de-contouring a block-encoded video signal.

The process performed by de-contouring unit 106 is described with reference to FIG. 9. The video bitstream output from the decoder 104 is first processed at the information collection stage 112, wherein macroblock mode and non-zero DCT coefficients information are obtained from the decoding process performed by decoder 104. The bitstream data is divided into several layers, e.g. picture layer, group of blocks (GOB) layer, macroblock layer, block layer, etc. Each of these layers contains information necessary for decoding the image data. For example, under the MPEG4 standard, "mcbpc" (indicating whether the macroblock is intra-coded or inter-coded and the coded block pattern for chrominance), "cbpy" (indicating the coded block pattern for luminance), and the non-zero DCT coefficient information are collected under the macroblock layer.

The coding information obtained from step 112 is then used to check for contouring, shown as step 114. If contouring is detected, contour filtering is applied at step 118. If contouring is not detected at a particular location, the system determines if all the blocks have been examined at step 122, and checks for the next possible contouring location at step 120. For example, in FIG. 11, the other vertical boundary 142, and the horizontal boundaries 146 and 148, of block A are examined. Block B is then evaluated, and so on. The process repeats until all blocks have been examined.

Figure 10:
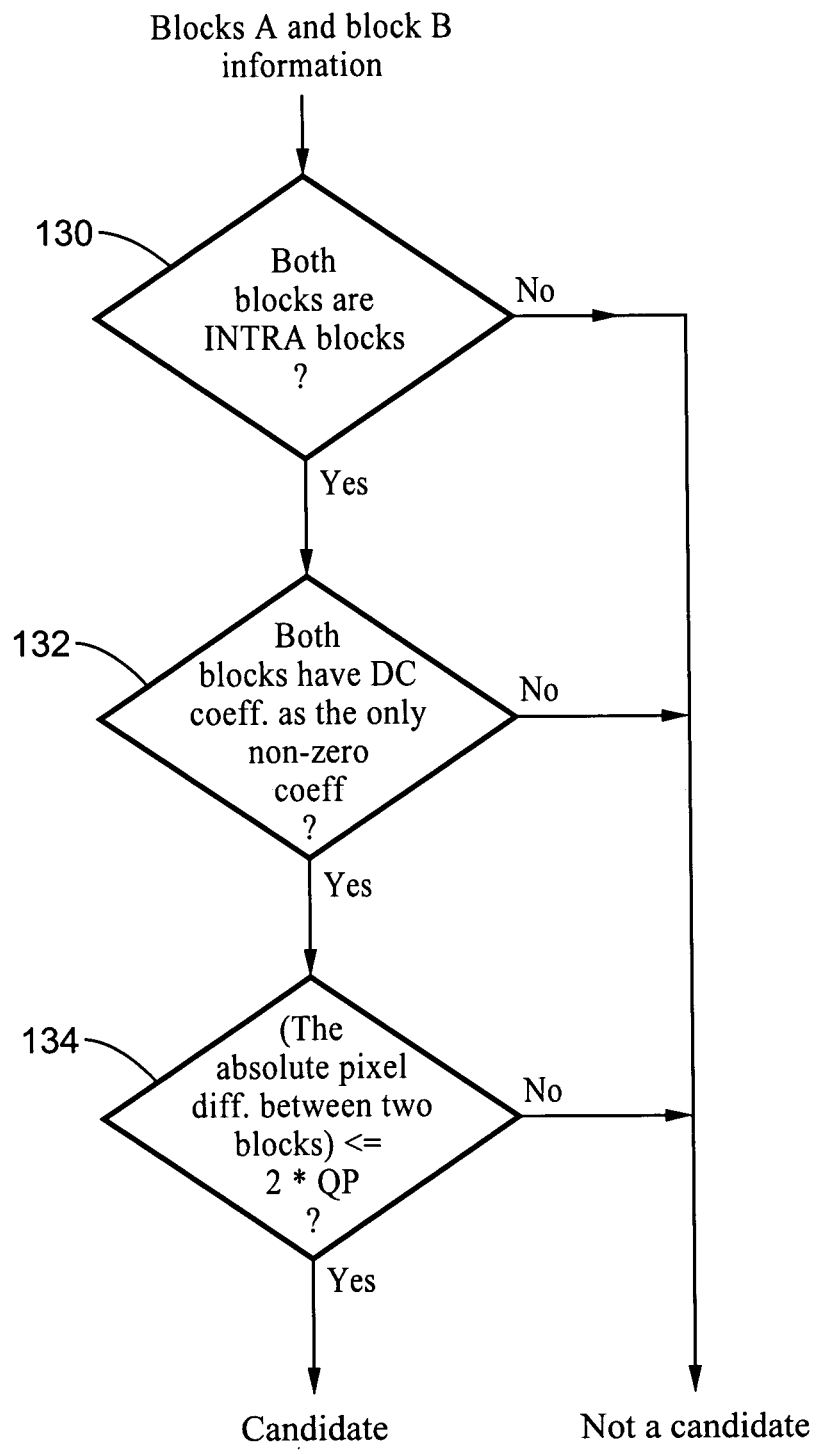
FIG. 10 shows a flow chart of determining contouring effect candidate blocks according to the present invention.
Figure 11:
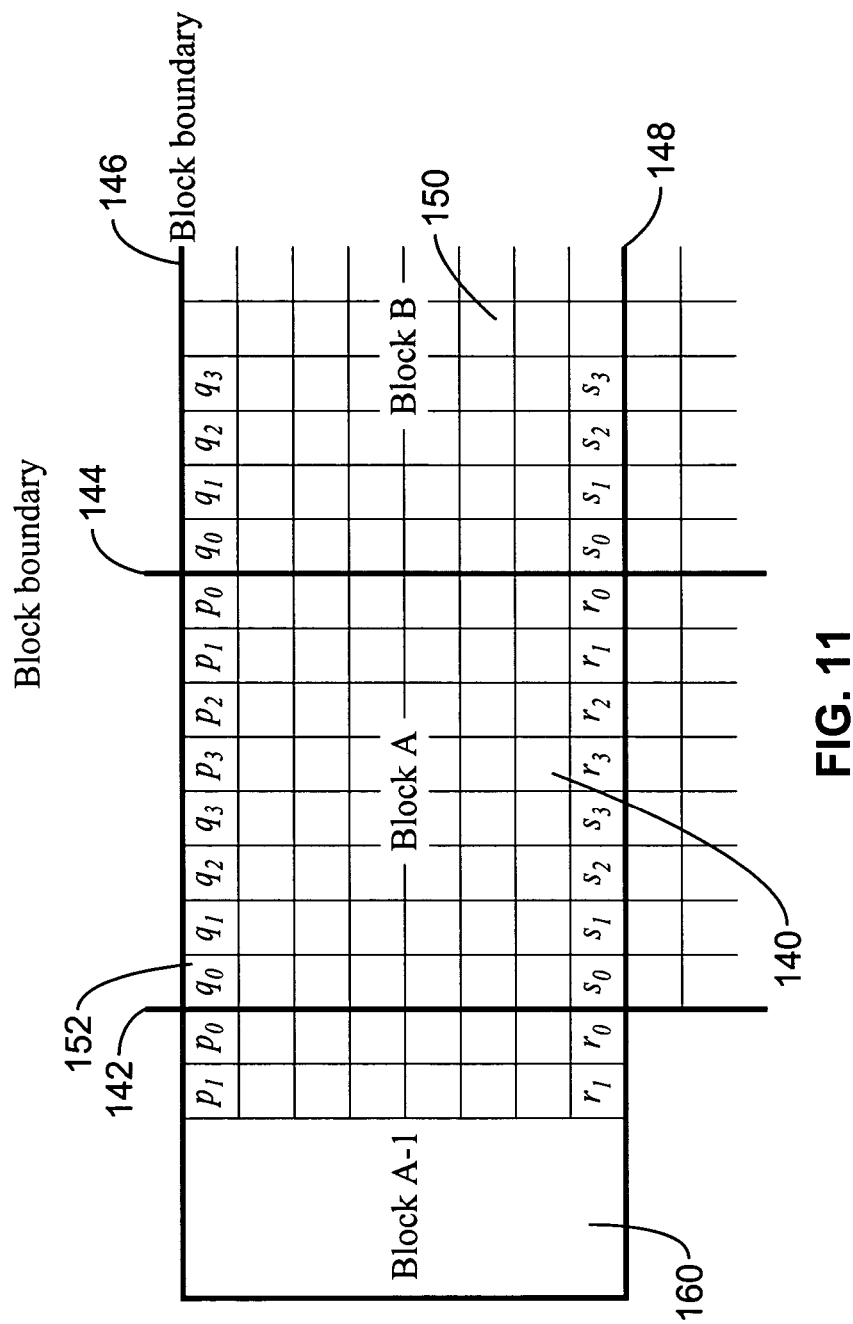
FIG. 11 illustrates the configuration of a series of blocks and block boundaries in accordance with the present invention.

The contouring effect candidate determination step 116 is further detailed in FIG. 10. FIG. 11 illustrates vertical block boundary 144 between reconstructed block A 140 and block B 150. Each block is an 8×8 grid of pixels.

Referring back to FIG. 10, macroblock mode and DCT coefficient distributions are examined to determine whether the contouring effect will occur or not. The system first checks if block A and block B are intra-coded blocks at step 130. If either block is an inter-coded block, then the boundary 144 is ruled not a candidate, and step 122 is applied. If both blocks are intra-coded blocks, then the DC and AC components are evaluated at block 132. If either block A or block B have a non-zero AC coefficient, then the boundary 144 is ruled not a candidate, and step 122 is applied. Thus, the block boundary 144 between block A and block B may only be ruled as a contouring effect candidate if both block A and block B are intra-coded blocks and the only non-zero coefficients in block A and block B are DC coefficients. This is because contouring artifacts mainly occur on the boundary of two intra-coded blocks only having non-zero AC coefficients. If an intra-coded block has AC coefficients, then the block will not be totally flat and no contouring artifact will be seen.

Finally, the blocks are evaluated in step 134 to determine whether the discontinuity is an actual image edge or an artificial image edge, similar to 76 of the de-blocking method of FIG. 6. If the absolute value of the pixel difference on both sides of the boundary is below a threshold value, e.g. less than two times the value of the quantization parameter, than the pixel in question is assumed to be a false edge, and the boundary is considered a contour effect candidate to be filtered at step 118. If the absolute difference between the two blocks is above the threshold value, the boundary is considered a real object edge and is not filtered.

If the block boundary is a candidate in step 116, contour filtering step 118 is applied. Preferably, a uniform filter (i.e., a filter where all coefficients are equal to 1) is utilized to perform the low-pass filtering. The length of the filter is decided by the number of blocks having similar (equal) pixels values on opposite sides of the boundary. An exemplary process for determining whether adjacent blocks have similar pixel values is as follows:

First, the number of similar blocks on one side (e.g. the left-hand side for a vertical boundary) is calculated. Referring to FIG. 11, if the value of pixel $q_0$ 152 in block A is the same as the pixel values of $p_0$ and $p_1$ in block A-1 to the left of block A and the pixel value of $s_0$ in block A is the same as the pixel values of $r_0$ and $r_1$ in block A-1, then block A1 is considered a similar block. The block left to the block A-1 is then compared to A-1 in a similar fashion and so on. The number of similar blocks on the left side is defined as $N_{left}$.

The process is then repeated for block B on the right, and the number of similar blocks on the right is defined as $N_{right}$. The length of the filter is calculated as the lesser of $N_{left}$ and $N_{right}$ multiplied by the block size X, i.e. $\min(N_{left}, N_{right})*X$, where X is the block size and X=8 in the MPEG-4 case shown in FIG. 11. Thus, if $N_{left}=3$ and $N_{right}=4$, then the filter size would be 24.

The above example is applied for the vertical boundaries 142, 144. The process is repeated for $N_{top}$ and $N_{bottom}$ to determine the filter size in the horizontal boundary.

Figure 8B:
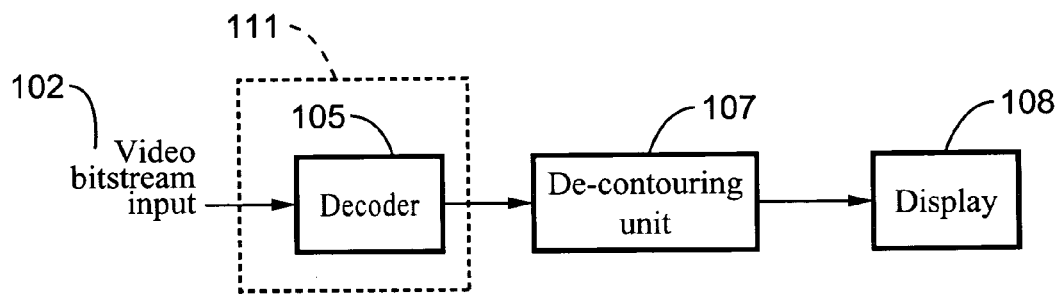
FIG. 8B is a is a schematic view of the de-contouring unit the present invention applied to the output of a decoder.

FIG. 8A shows the de-contouring unit 106 integrated with decoder 104 to form video player 110 having de-contouring capability. However, as illustrated in FIG. 8B, an alternative embodiment may comprise de-contouring unit 107 as a stand-alone unit. In this configuration, de-contouring unit 107 would comprise post-processing software to further process the output from video player 111 and decoder 105.

Figure 3A:
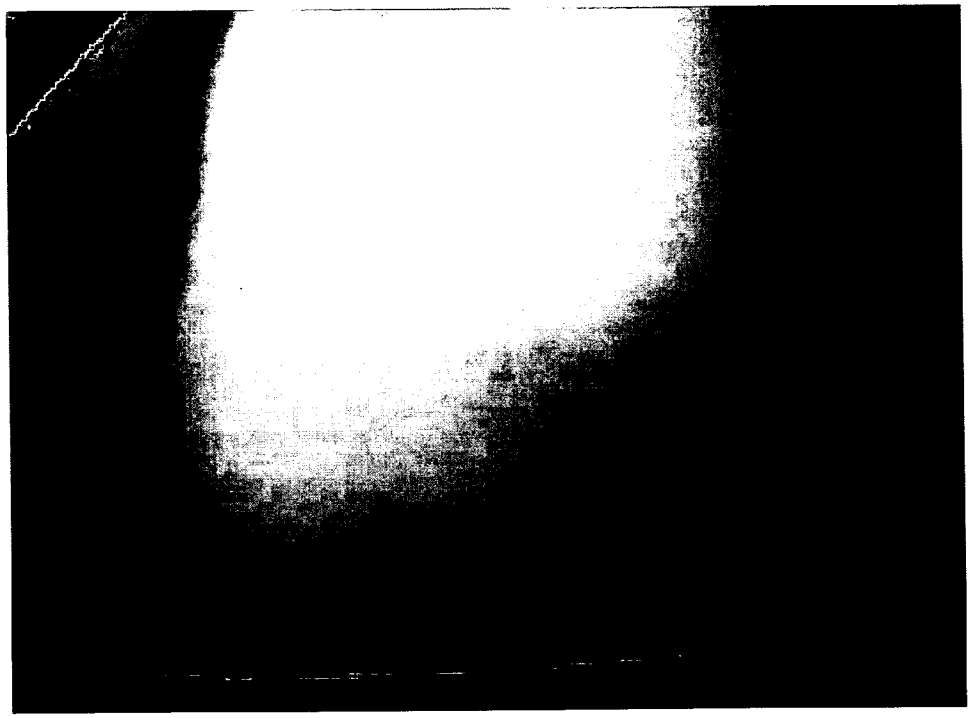
FIGS. 3A and 3B illustrate contouring effect in a block-encoded image.
Figure 3B:
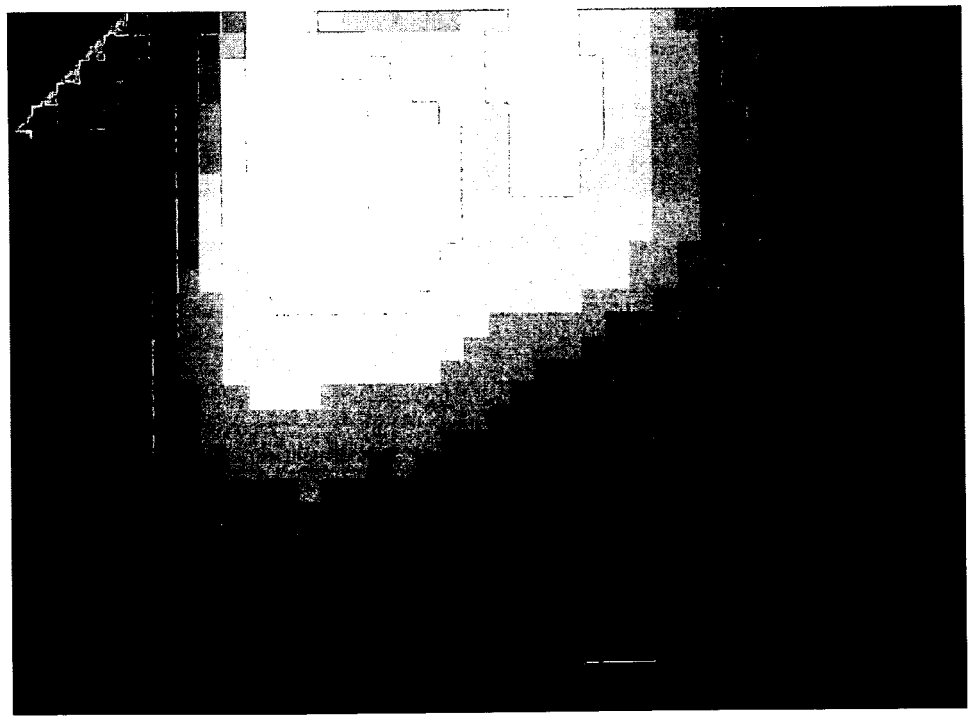
Figure 12:
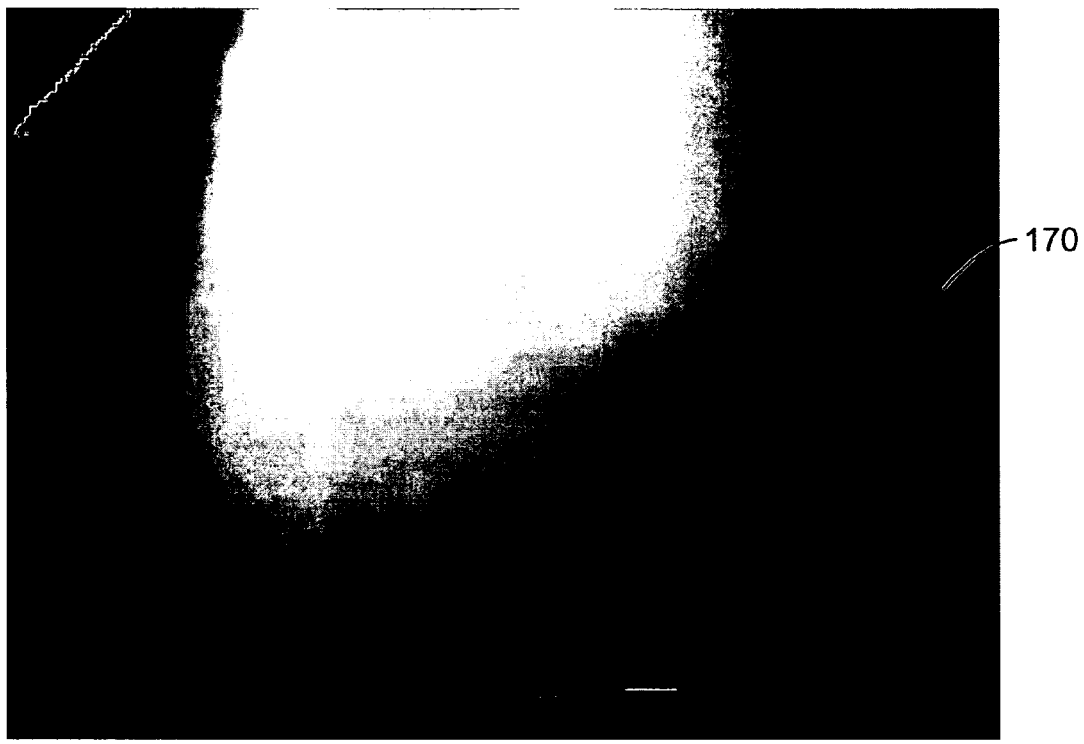
FIG. 12 shows the output of a block encoded imaged processed with the de-contouring unit of the present invention.

FIG. 12 shows the output of the de-contouring unit of the present invention applied to or integrated with a decoder. When compared to the same video frame in FIG. 3 from a decoder without contour enhancement, a significant reduction in the amount of contouring effect can be recognized for surface 170.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for decoding a block-encoded video signal within a video decoder configured for receiving a block encoded video signal, said method comprising:
   decoding, within a decoder, a block-encoded signal subject to blocking artifacts resulting from the encoding process, to obtain a decoded sequence of video frames having one or more associated motion vectors;
   communicating macroblock location, as a motion vector and coding mode, with respect to a reference frame from the decoder to a deblocking filter; and
   filtering blocking artifacts from a macroblock within a current frame by using the deblocking filter in response to,
       determining where the macroblock was located within the reference frame as identified by the motion vector,
       identifying blocking artifacts within areas of the macroblock, in response to the motion vector information, at which a boundary existed across the macroblock in the reference frame,
       wherein said blocking artifacts arise near the macroblock boundary from a previous frame used as the reference frame; and
       pixel filtering of blocking artifacts near where the boundary existed across the macroblock as found in the reference frame, and which may comprise any pixel locations within the macroblock, including pixels located toward the center of the macroblock.

2. A method as recited in claim 1, wherein each video frame comprises a plurality of macroblocks, each macroblock comprising a plurality of blocks, each block comprising an array of pixels.

3. A method as recited in claim 2, wherein filtering the location identified by the motion vector comprises filtering blocking artifacts at a location toward the center of a block.

4. A method as recited in claim 2:
   wherein identifying the location of one or more blocking artifacts comprises determining whether a macroblock is an intra-coded macroblock or an inter-coded macroblock; and
   wherein filtering the location within the frame comprises only filtering inter-coded macroblocks which have motion vectors.

5. A method as recited in claim 4:
   wherein an inter-coded macroblock is further evaluated to determine whether a discontinuity associated with the motion vector is artificial or an actual image edge; and
   wherein filtering the location within the frame comprises only filtering artificial discontinuities.

6. A method as recited in claim 5, wherein determining whether a discontinuity is artificial comprises:
   evaluating the pixels bordering both sides of the discontinuity; and
   filtering the discontinuity if the difference in the pixels fall below a threshold value.

7. A method as recited in claim 6:
   wherein a quantization parameter is obtained from the decoded video signal; and wherein the discontinuity is filtered if the absolute value of the pixel difference on both sides of the discontinuity is less than two times the quantization parameter.

8. A method as recited in claim 5, wherein filtering the location within the frame comprises filtering the outer two most pixels bordering both sides of the discontinuity.

9. A method as recited in claim 1, wherein filtering comprises applying a low pass filter to remove the blocking artifact.

10. A method as recited in claim 2, further comprising filtering the macroblock at the block boundary.

11. A system for decoding a block-encoded video signal, comprising:
 a first processing element adapted to execute macroblock decoding operations on a video signal comprising a sequence of video frames having one or more associated motion vectors;
 said first processing element communicating motion vector information determined during decoding to a deblocking filter;
 a second processing element within the deblocking filter adapted for,
  determining where the macroblock of a reconstructed frame was located within a reference frame based on the motion vector obtained from the macroblock decoding operation,
  identifying the location of at least one blocking artifact where a boundary existed across the macroblock in the reference frame, said blocking artifacts may be identified at any pixel locations within the macroblock including toward the center of the macroblock; and
 a first filter for smoothing blocking artifacts identified by the first processing element.

12. A system as recited in claim 11, wherein each video frame comprises a plurality of macroblocks, each macroblock comprising a plurality of blocks, each block comprising an array of pixels.

13. A system as recited in claim 11, further comprising a second filter for filtering blocking artifacts at the block boundary of the macroblocks.

14. A system as recited in claim 11, wherein the first filter comprises a low pass filter.

15. A system as recited in claim 11, wherein the first filter comprises a five-tap low pass filter.

16. A system as recited is claim 11, wherein the first filter only filters macroblocks comprising inter-coded macroblocks.

17. A system as recited in claim 16, wherein the first filter only filters blocking artifacts comprising artificial discontinuities.

18. An apparatus for decoding a block-encoded video signal, comprising:
 means for decoding a block-encoded video signal, containing blocking artifacts resulting from the encoding process, to obtain a decoded sequence of video frames having one or more associated motion vectors;
 wherein said blocking artifacts arise near the macroblock boundary from a previous frame used as a reference frame;
 said means for decoding is configured to communicate said macroblock location, as a motion vector and coding mode, to a means for filtering;
 means for filtering the location within the frame identified by the motion vector in said means for decoding to remove blocking artifacts;
 wherein blocking artifacts are identified by said means for filtering and are filtered from an area of said macroblock at which a macroblock boundary existed for the macroblock in the reference frame and comprises any pixel locations within the macroblock inclusive of pixel locations toward the center of the macroblock.

19. An apparatus as recited in claim 18, wherein each video frame comprises a plurality of macroblocks, each macroblock comprising a plurality of blocks, each block comprising an array of pixels.

20. An apparatus as recited in claim 19, further comprising a means for filtering a block boundary to remove blocking artifacts.

21. An apparatus as recited in claim 19, further comprising:
 a means for determining whether the macroblock is inter-coded or intra-coded;
 wherein only inter-coded macroblocks are filtered.

22. An apparatus as recited in claim 19, further comprising:
 a means for determining whether a discontinuity associated with the motion vector is an artificial discontinuity of a real image edge;
 wherein only artificial discontinuities are filtered.

23. An apparatus for removing blocking artifacts from a decoded video signal, comprising:
 at least one processing element configured as a deblocking filter for processing a previously decoded signal comprising a sequence of video frames having one or more associated motion vectors determined during decoding and communicated from a decoder to said deblocking filter;
 said processing element configured for,
  determining the location where the macroblock was located within a reference frame as identified by the motion vector associated with a macroblock obtained from the decoded video signal,
  determining the location of at least one blocking artifact within areas of the macroblock in response to the associated motion vectors at which a boundary existed across the macroblock in the reference frame, irrespective of current frame macroblock boundary; and
 a first filter for smoothing blocking artifacts in response to the location identified by motion vectors received from the first processing element.

24. An apparatus as recited in claim 23, wherein each video frame comprises a plurality of macroblocks, each macroblock comprising a plurality of blocks, each block comprising an array of pixels.

25. A system as recited in claim 24, further comprising a second filter for filtering blocking artifacts at a boundary of the blocks.

26. A system as recited in claim 23, wherein the first filter comprises a low pass filter.

27. A method for removing blocking artifacts from a block-encoded video signal within a video decoder configured for receiving a block encoded video signal, said method comprising:
 receiving a motion vector associated with a location of a macroblock from a decoder which has decoded an encoded video signal;
 identifying blocking artifacts, within a deblocking filter, in response to receiving the motion vector and determining where a boundary existed across the macroblock in a reference frame which
 can arise at any pixel locations, including central locations, within macroblocks of a reconstructed frame; and filtering the location within the reconstructed frame near where the boundary existed across the macroblock in the reference frame to remove blocking artifacts.

28. A method as recited in claim 27, wherein each video frame comprises a plurality of macroblocks, each macroblock comprising a plurality of blocks, each block comprising an array of pixels.

29. A method as recited in claim 28:
wherein identifying the location of one or more blocking artifacts comprises determining whether a macroblock is an intra-coded macroblock or an inter-coded macroblock; and
wherein filtering the location within the frame comprises only filtering inter-coded macroblocks.

30. A method as recited in claim 29:
wherein an inter-coded macroblock is further evaluated to determine whether a discontinuity associated with the motion vector is artificial or an actual image edge; and
wherein filtering the location within the frame comprises only filtering artificial discontinuities.

31. A method as recited in claim 30:
wherein a quantization parameter is obtained from the decoded video signal; and
wherein the discontinuity is filtered if the absolute value of the pixel difference on both sides of the discontinuity is less than two times the quantization parameter.

32. A method as recited in claim 30, wherein filtering the location within the frame comprises filtering the outer two most pixels bordering both sides of the discontinuity.

33. A method as recited in claim 27, wherein filtering comprises applying a low pass filter to remove the blocking artifact.

34. A method as recited in claim 28, further comprising filtering the macroblock at the block boundary.

\* \* \* \* \*